(12) United States Patent
Luckevich (10) Patent No.: US 8,156,962 B2
(45) Date of Patent: Apr. 17, 2012

(54) MICROVALVE DEVICE

(75) Inventor: Mark S. Luckevich, Austin, TX (US)

(73) Assignee: Dunan Microstaq, Inc., Dallas, TX (US)

( * ) Notice: Subject to any disclaimer, the term of this patent is extended or adjusted under 35 U.S.C. 154(b) by 491 days.

(21) Appl. No.: 12/519,259

(22) PCT Filed: Dec. 14, 2007

(86) PCT No.: PCT/US2007/025680
§ 371 (c)(1),
(2), (4) Date: Jun. 15, 2009

(87) PCT Pub. No.: WO2008/076388
PCT Pub. Date: Jun. 26, 2008

(65) Prior Publication Data
US 2010/0019177 A1 Jan. 28, 2010

(51) Int. Cl.
*F15B 13/04* (2006.01)
(52) U.S. Cl. ............... 137/625.6; 137/829; 137/625.66; 137/625.68
(58) Field of Classification Search ............. 137/625.6, 137/625.64, 625.66, 625.69, 625.68, 829; 137/831, 833; 91/418, 461
See application file for complete search history.

(56) References Cited

U.S. PATENT DOCUMENTS

| | | | |
|---|---|---|---|
| 886,045 A | 4/1908 | Ehrlich et al. | |
| 1,886,205 A | 11/1932 | Lyford | |
| 1,926,031 A | 9/1933 | Boynton | |
| 2,412,205 A | 12/1946 | Cook | |
| 2,504,055 A | 4/1950 | Thomas | |
| 2,840,107 A | 6/1958 | Campbell | |
| 2,875,779 A | 3/1959 | Campbell | |
| 3,031,747 A | 5/1962 | Green | |
| 3,540,218 A * | 11/1970 | Finn, Jr. .......................... 60/430 |

(Continued)

FOREIGN PATENT DOCUMENTS

DE 2215526 10/1973
(Continued)

OTHER PUBLICATIONS

Günther, Götz, "Entwicklung eines pneumatischen 3/2-Wege-Mikroventils", O + P Olhydraulik Und Pneumatik, Vereinigte Fachverlage, Mainz, DE, vol. 42, No. 6, Jun. 1, 1998, pp. 396-398, XP000831050, ISSN: 0341-2660.

(Continued)

*Primary Examiner* — Craig Schneider
(74) *Attorney, Agent, or Firm* — MacMillan, Sobanski & Todd, LLC (57) ABSTRACT

A microvalve device for controlling fluid flow includes a body defining a chamber having first and second ends. The first end is in communication with a source of command pressure. The second end in communication with a source of load pressure. A micromachined spool valve is disposed in the chamber between the first and second ends for sliding movement by differential pressure across the spool between a first position in which allows fluid flow between the source of load pressure and a source of supply pressure and a second position which allows fluid flow between the source of load pressure and a pressure vent. The spool valve has a closed position intermediate the first position and the second position which restricts fluid flow between the source of load pressure and both the source of supply pressure and the pressure vent. The spool valve is moveably connected to the body.

20 Claims, 4 Drawing Sheets

U.S. PATENT DOCUMENTS

| | | | |
|---|---|---|---|
| 3,729,807 | A | 5/1973 | Fujiwara |
| 3,747,628 | A | 7/1973 | Holster et al. |
| 3,860,949 | A | 1/1975 | Stoeckert et al. |
| 4,005,454 | A | 1/1977 | Froloff et al. |
| 4,019,388 | A | 4/1977 | Hall, II et al. |
| 4,023,725 | A | 5/1977 | Ivett et al. |
| 4,100,236 | A | 7/1978 | Gordon et al. |
| 4,152,540 | A | 5/1979 | Duncan et al. |
| 4,181,249 | A | 1/1980 | Peterson et al. |
| 4,298,023 | A | 11/1981 | McGinnis |
| 4,341,816 | A | 7/1982 | Lauterbach et al. |
| 4,434,813 | A | 3/1984 | Mon |
| 4,476,893 | A | 10/1984 | Schwelm |
| 4,543,875 | A | 10/1985 | Imhof |
| 4,581,624 | A | 4/1986 | O'Connor |
| 4,593,719 | A | 6/1986 | Leonard |
| 4,628,576 | A | 12/1986 | Giachino et al. |
| 4,647,013 | A | 3/1987 | Giachino et al. |
| 4,661,835 | A | 4/1987 | Gademann et al. |
| 4,772,935 | A | 9/1988 | Lawler et al. |
| 4,821,997 | A | 4/1989 | Zdeblick |
| 4,824,073 | A | 4/1989 | Zdeblick |
| 4,826,131 | A | 5/1989 | Mikkor |
| 4,828,184 | A | 5/1989 | Gardner et al. |
| 4,869,282 | A | 9/1989 | Sittler et al. |
| 4,938,742 | A | 7/1990 | Smits |
| 4,943,032 | A | 7/1990 | Zdeblick |
| 4,946,350 | A | 8/1990 | Suzuki et al. |
| 4,959,581 | A | 9/1990 | Dantlgraber |
| 4,966,646 | A | 10/1990 | Zdeblick |
| 5,029,805 | A | 7/1991 | Albarda et al. |
| 5,037,778 | A | 8/1991 | Stark et al. |
| 5,050,838 | A | 9/1991 | Beatty et al. |
| 5,054,522 | A | 10/1991 | Kowanz et al. |
| 5,058,856 | A | 10/1991 | Gordon et al. |
| 5,061,914 | A | 10/1991 | Busch et al. |
| 5,064,165 | A | 11/1991 | Jerman |
| 5,065,978 | A | 11/1991 | Albarda et al. |
| 5,066,533 | A | 11/1991 | America et al. |
| 5,069,419 | A | 12/1991 | Jerman |
| 5,074,629 | A | 12/1991 | Zdeblick |
| 5,082,242 | A | 1/1992 | Bonne et al. |
| 5,096,643 | A | 3/1992 | Kowanz et al. |
| 5,116,457 | A | 5/1992 | Jerman |
| 5,131,729 | A | 7/1992 | Wetzel |
| 5,133,379 | A | 7/1992 | Jacobsen et al. |
| 5,142,781 | A | 9/1992 | Mettner et al. |
| 5,161,774 | A | 11/1992 | Engelsdorf et al. |
| 5,169,472 | A | 12/1992 | Goebel |
| 5,176,358 | A | 1/1993 | Bonne et al. |
| 5,177,579 | A | 1/1993 | Jerman |
| 5,178,190 | A | 1/1993 | Mettner |
| 5,179,499 | A | 1/1993 | MacDonald et al. |
| 5,180,623 | A | 1/1993 | Ohnstein |
| 5,197,517 | A | 3/1993 | Perera |
| 5,209,118 | A | 5/1993 | Jerman |
| 5,215,244 | A | 6/1993 | Buchholz et al. |
| 5,216,273 | A | 6/1993 | Doering et al. |
| 5,217,283 | A | 6/1993 | Watanabe |
| 5,222,521 | A | 6/1993 | Kihlberg |
| 5,238,223 | A | 8/1993 | Mettner et al. |
| 5,244,537 | A | 9/1993 | Ohnstein |
| 5,267,589 | A | 12/1993 | Watanabe |
| 5,271,431 | A | 12/1993 | Mettner et al. |
| 5,271,597 | A | 12/1993 | Jerman |
| 5,309,943 | A | 5/1994 | Stevenson et al. |
| 5,323,999 | A | 6/1994 | Bonne et al. |
| 5,325,880 | A | 7/1994 | Johnson et al. |
| 5,333,831 | A | 8/1994 | Barth et al. |
| 5,336,062 | A | 8/1994 | Richter |
| 5,355,712 | A | 10/1994 | Petersen et al. |
| 5,368,704 | A | 11/1994 | Madou et al. |
| 5,375,919 | A | 12/1994 | Furuhashi |
| 5,400,824 | A | 3/1995 | Gschwendtner et al. |
| 5,417,235 | A | 5/1995 | Wise et al. |
| 5,445,185 | A | 8/1995 | Watanabe et al. |
| 5,458,405 | A | 10/1995 | Watanabe |
| 5,543,349 | A | 8/1996 | Kurtz et al. |
| 5,553,790 | A | 9/1996 | Findler et al. |
| 5,566,703 | A | 10/1996 | Watanabe et al. |
| 5,577,533 | A | 11/1996 | Cook, Jr. |
| 5,611,214 | A | 3/1997 | Wegeng et al. |
| 5,785,295 | A | 7/1998 | Tsai |
| 5,810,325 | A | 9/1998 | Carr |
| 5,838,351 | A | 11/1998 | Weber |
| 5,848,605 | A | 12/1998 | Bailey et al. |
| 5,856,705 | A | 1/1999 | Ting |
| 5,873,385 | A | 2/1999 | Bloom et al. |
| 5,908,098 | A * | 6/1999 | Gorman et al. ............ 192/109 F |
| 5,909,078 | A | 6/1999 | Wood et al. |
| 5,926,955 | A | 7/1999 | Kober |
| 5,941,608 | A | 8/1999 | Campau et al. |
| 5,954,079 | A | 9/1999 | Barth et al. |
| 5,955,817 | A | 9/1999 | Dhuler et al. |
| 5,970,998 | A | 10/1999 | Talbot et al. |
| 5,994,816 | A | 11/1999 | Dhuler et al. |
| 6,019,437 | A | 2/2000 | Barron et al. |
| 6,023,121 | A | 2/2000 | Dhuler et al. |
| 6,038,928 | A | 3/2000 | Maluf et al. |
| 6,041,650 | A | 3/2000 | Swindler et al. |
| 6,096,149 | A | 8/2000 | Hetrick et al. |
| 6,105,737 | A | 8/2000 | Weigert et al. |
| 6,114,794 | A | 9/2000 | Dhuler et al. |
| 6,116,863 | A | 9/2000 | Ahn et al. |
| 6,123,316 | A | 9/2000 | Biegelsen et al. |
| 6,124,663 | A | 9/2000 | Haake et al. |
| 6,171,972 | B1 | 1/2001 | Mehregany et al. |
| 6,182,742 | B1 | 2/2001 | Takahashi et al. |
| 6,224,445 | B1 | 5/2001 | Neukermans et al. |
| 6,255,757 | B1 | 7/2001 | Dhuler et al. |
| 6,279,606 | B1 | 8/2001 | Hunnicutt et al. |
| 6,283,441 | B1 | 9/2001 | Tian |
| 6,386,507 | B2 | 5/2002 | Dhuler et al. |
| 6,390,782 | B1 | 5/2002 | Booth et al. |
| 6,494,804 | B1 | 12/2002 | Hunnicutt et al. |
| 6,505,811 | B1 | 1/2003 | Barron et al. |
| 6,520,197 | B2 | 2/2003 | Deshmukh et al. |
| 6,523,560 | B1 | 2/2003 | Williams et al. |
| 6,533,366 | B1 | 3/2003 | Hunnicutt et al. |
| 6,540,203 | B1 | 4/2003 | Hunnicutt |
| 6,581,640 | B1 | 6/2003 | Barron |
| 6,637,722 | B2 | 10/2003 | Hunnicutt |
| 6,662,581 | B2 | 12/2003 | Hirota et al. |
| 6,694,998 | B1 | 2/2004 | Hunnicutt |
| 6,724,718 | B1 | 4/2004 | Shinohara et al. |
| 6,761,420 | B2 | 7/2004 | Maluf et al. |
| 6,845,962 | B1 | 1/2005 | Barron et al. |
| 6,872,902 | B2 | 3/2005 | Cohn et al. |
| 6,958,255 | B2 | 10/2005 | Khuri-Yakub et al. |
| 6,966,329 | B2 | 11/2005 | Liberfarb |
| 7,011,378 | B2 | 3/2006 | Maluf et al. |
| 7,063,100 | B2 | 6/2006 | Liberfarb |
| 7,210,502 | B2 | 5/2007 | Fuller et al. |
| 7,372,074 | B2 | 5/2008 | Milne et al. |
| 2002/0014106 | A1 | 2/2002 | Srinivasan et al. |
| 2002/0029814 | A1 | 3/2002 | Unger et al. |
| 2002/0096421 | A1 | 7/2002 | Cohn et al. |
| 2002/0174891 | A1 | 11/2002 | Maluf et al. |
| 2003/0061889 | A1 | 4/2003 | Tadigadapa et al. |
| 2003/0092526 | A1 | 5/2003 | Hunnicutt et al. |
| 2003/0098612 | A1 | 5/2003 | Maluf et al. |
| 2003/0159811 | A1 | 8/2003 | Nurmi |
| 2003/0206832 | A1 | 11/2003 | Thiebaud et al. |
| 2005/0121090 | A1 | 6/2005 | Hunnicutt |
| 2005/0200001 | A1 | 9/2005 | Joshi et al. |
| 2005/0205136 | A1 | 9/2005 | Freeman |
| 2006/0218953 | A1 | 10/2006 | Hirota |
| 2010/0225708 | A1 | 9/2010 | Peng et al. |

FOREIGN PATENT DOCUMENTS

| | | |
|---|---|---|
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |

| | | |
|---|---|---|
| EP | 1024285 | 8/2000 |
| GB | 2238267 | 5/1991 |
| JP | SHO 39-990 | 2/1964 |
| JP | 2001184125 | 7/2001 |
| JP | 2006-080194 | 3/2006 |
| WO | WO99/16096 | 4/1999 |
| WO | WO99/24783 | 5/1999 |
| WO | WO00/14415 | 3/2000 |
| WO | WO2005/084211 | 9/2005 |

OTHER PUBLICATIONS

Gui, C. et al, "Selective Wafer Bonding by Surface Roughness Control", Journal of the Electrochemical Society, 148 (4) G225-G228 (2001).

Gui, C. et al., "Fusion bonding of rough surfaces with polishing technique for silicon micromachining", Microsystem Technologies (1997) 122-128.

Zhixiong Liu et al., "Micromechanism fabrication using silicon fusion bonding", Robotics and Computer Integrated Manufacturing 17 (2001) 131-137.

International Search Report dated Apr. 5, 2010 for Application No. PCT/US2009/05355.

Booth, Steve and Kaina, Rachid, Fluid Handling—Big Gains from Tiny Valve, Appliance Design (Apr. 2008), pp. 46-48.

Controls Overview for Microstaq Silicon Expansion Valve (SEV), Rev. 1, Dec. 2008, http://www.microstaq.com/pdf/SEV_controls.pdf, accessed May 17, 2010.

Copeland, Michael V., Electronic valves promise big energy savings, FORTUNE (Sep. 9, 2008), http://techland.blogs.fortune.cnn.com/2008/09/09/electronic-valves-promise-big-energy-savings, accessed Sep. 9, 2008.

Higginbotham, Stacey, Microstaq's Tiny Valves Mean Big Energy Savings, http//earth2tech.com/2008/09/09/microstaqs-tiny-valves-mean-big-energy savings (posted Sep. 9, 2008), accessed Sep. 9, 2008.

Keefe, Bob, Texas firm says value-replacing chip can drastically cut energy use, Atlanta Metro News (Sep. 10, 2008), http://www.ajc.com/search/content/shared/money/stories/2008/09/microstaq10_cox-F9782.html, accessed Sep. 10, 2008.

Luckevich, Mark, MEMS microvlaves: the new valve world, Valve World (May 2007), pp. 79-83.

MEMS, Microfluidics and Microsystems Executive Review, http:www.memsinvestorjournal.com/2009/04/mems-applications-for-flow-control-.html, accessed May 17, 2010, Published Apr. 16, 2009.

Microstaq Announces High Volume Production of MEMS-Based Silicon Expansion Valve, http://www.earthtimes.org/articles/printpressstory.php?news+1138955 (posted Jan. 27, 2010), accessed Jan. 27, 2010.

Microstaq Product Description, Proportional Direct Acting Silicon Control Valve (PDA-3), http://www.microstaq.com/products/pda3.html, accessed May 17, 2010, Published 2008.

Microstaq Product Description, Proportional Piloted Silicon Control Valve (CPS-4), http://www.microstaq.com/products/cps4.html, accessed May 17, 2010, Published 2008.

Microstaq Product Descriptions, SEV, CPS-4, and PDA-3, http://www.microstaq.com/products/index.html, accessed May 17, 2010, Published 2009.

Microstaq Technology Page, http://www.microstaq.com/technology/index.html, accessed May 17, 2010, Published 2008.

Press Release, Freescale and Microstaq Join Forces on Smart Superheat Control System for HVAC and Refrigeration Efficiency, http://www.microstaq.com/pressReleases/prDetail_04.html (posted Jan. 22, 2008), accessed May 17, 2010.

Press Release, Microstaq Mastering Electronic Controls for Fluid-Control Industry, http://www.microstaq.com/pressReleases/prDetail_02.html (posted May 5, 2005), accessed May 17, 2010.

Press Release, Microstaq Unveils Revolutionary Silicon Expansion Valve at Demo 2008, http://www.microstaq.com/pressReleases/prDetail_05.html (posted Sep. 8, 2008), accessed May 17, 2010.

Press Release, Nanotechnology Partnerships, Connections Spur Innovation for Fluid Control Industries, http://www.microstaq.com/pressReleases/prDetail_03.html (posted Jun. 9, 2005), accessed May 17, 2010.

Product Review, greentechZONE Products for the week of May 18, 2009, http://www.en-genius.net/site/zones/greentechZONE/product_reviews/grnp_051809, accessed May 17, 2010.

Silicon Expansion Valve Data Sheet, http://www.microstaq.com/pdf/SEV_Datasheet_1_8.pdf, accessed May 17, 2010.

Silicon Expansion Valve Information Sheet, http://www.microstaq.com/pdf/SEV_Infosheet_2_0.pdf, accessed May 17, 2010.

SMIC Announces Successful Qualification of a MEMS Chip for Microstaq, http://www.prnewswire.com/news-releases/smic-announces-successful-qualification-of-a-mems-chip-for-microstaq-65968252.html (posted Oct. 26, 2009), accessed May 17, 2010.

SMIC quals Microstaq MEMS chip for fluid control, http://www.electroiq.com/ElectroiQ/en-us/index/display/Nanotech_Article_Tools_Template.articles.small-times.nanotechmems.mems.microfluidics.2009.10.smic-quals_microstaq.html, (posted Oct. 26, 2009), acc.

Tiny Silicon Chip Developed by Microstaq Will Revolutionize Car Technology, http://www.nsti.org/press/PRshow.html?id=160 (posted May 19, 2005), accessed May 19, 2005.

Turpin, Joanna R., Soft Economy, Energy Prices Spur Interest in Technologies, http://www.achrnews.com/copyright/BNP_GUID_9-5-2006_A_10000000000000483182, accessed May 18, 2010, Published Dec. 8, 2008.

Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.

"A Silicon Microvalve for the Proportional Control of Fluids" by K.R. Williams, N. I. Maluf, E.N. Fuller, R.J. Barron, D. P. Jaeggi, and B.P. van Drieenhuizen, Transducers '99, Proc. 10th International Conference on Solid State Sensors and Actuators, held Jun. 7-10, 1999, Sendai, Japan, pp. 18-21.

"Process for in-plane and out-of-plane single-crystal-silicon thermal microactuators"; J. Mark Noworolski, et al.; Sensors and Actuators A 55 (1996); pp. 65-69.

Ayon et al., "Etching Characteristics and Profile Control in a Time Multiplexed ICP Etcher," Proc. of Solid State Sensor and Actuator Workshop Technical Digest, Hilton Head SC, (Jun. 1998) 41-44.

Bartha et al., "Low Temperature Etching of Si in High Density Plasma Using SF6/02," Microelectronic Engineering, Elsevier Science B.V., vol. 27, (1995) 453-456.

Fung et al., "Deep Etching of Silicon Using Plasma" Proc. of the Workshop on Micromachining and Micropackaging of Transducers, (Nov. 7-8, 1984) pp. 159-164.

IEEE Technical Digest entitled "Compliant Electra-thermal Microactuators", J. Jonsmann, O. Sigmund, S. Bouwstra, Twelfth IEEE International Conference on Micro Electro Mechanical Systems held Jan. 17-21, 1999, Orlando, Florida, pp. 588-593, IEEE Catalog Number: 99CH36291C.

Klaassen et al., "Silicon Fusion Bonding and Deep Reactive Ion Etching; A New Technology for Microstructures," Proc., Transducers 95 Stockholm Sweden, (1995) 556-559.

Linder et al., "Deep Dry Etching Techniques as a New IC Compatible Tool for Silicon Micromachining," Proc,. Transducers, vol. 91, (Jun. 1991) pp. 524-527.

Petersen et al. "Surfaced Micromachined Structures Fabricated with Silicon Fusion Bonding" Proc., Transducers 91, (Jun. 1992) pp. 397-399.

Yunkin et al., "Highly Anisotropic Selective Reactive Ion Etching of Deep Trenches in Silicon," Microelectronic Engineering, Elsevier Science B.V., vol. 23, (1994) pp. 373-376.

* cited by examiner

MICROVALVE DEVICE

BACKGROUND OF THE INVENTION

This invention relates in general to valves for controlling fluid flow in a hydraulic or pneumatic system. More particularly, this invention relates to an improved microvalve device.

Valves are widely used for controlling the flow of a fluid from a source of pressurized fluid to a load device or from a load device to a pressure vent. Frequently, a pump, or other device, is provided as the source of pressured fluid. The flow of the fluid is selectively controlled by a valve to control the operation of the load device.

One type of valve is a microvalve. A microvalve system is a MicroElectroMechanical System (MEMS) relating in general to semiconductor electromechanical devices.

MEMS is a class of systems that are physically small, having features with sizes in the micrometer range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports.

A typical valve consists of a beam resiliently supported by the body at one end. In operation, the actuator forces the beam to bend about the supported end of the beam. In order to bend the beam, the actuator must generate a force sufficient to overcome the spring force associated with the beam. As a general rule, the output force required by the actuator to bend or displace the beam increases as the displacement requirement of the beam increases.

In addition to generating a force sufficient to overcome the spring force associated with the beam, the actuator must generate a force capable of overcoming the fluid flow forces acting on the beam that oppose the intended displacement of the beam. These fluid flow forces generally increase as the flow rate through the fluid ports increases.

As such, the output force requirement of the actuator and in turn the size of the actuator and the power required to drive the actuator generally must increase as the displacement requirement of the beam increases and/or as the flow rate requirement through the fluid ports increases.

One specific type of microvalve is the pilot operated microvalve. Typically, such a microvalve device includes a micro spool valve that is pilot operated by a microvalve of the type as described above. For Example, U.S. Pat. Nos. 6,494,804, 6,540,203, 6,637,722, 6,694,998, 6,755,761, 6,845,962, and 6,994,115 disclose pilot operated microvalves, the disclosures of which are herein incorporated by reference.

SUMMARY OF THE INVENTION

This invention relates in particular to an improved microvalve device.

A microvalve device for controlling fluid flow includes a body defining a chamber having first and second ends. The first end is in communication with a source of command pressure. The second end in communication with a source of load pressure. A micromachined spool valve is disposed in the chamber between the first and second ends for sliding movement by differential pressure across the spool valve between a first position in which allows fluid flow between the source of load pressure and a source of supply pressure and a second position which allows fluid flow between the source of load pressure and a pressure vent. The spool valve has a closed position intermediate the first position and the second position which restricts fluid flow between the source of load pressure and both the source of supply pressure and the pressure vent. The spool valve is moveably connected to the body.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
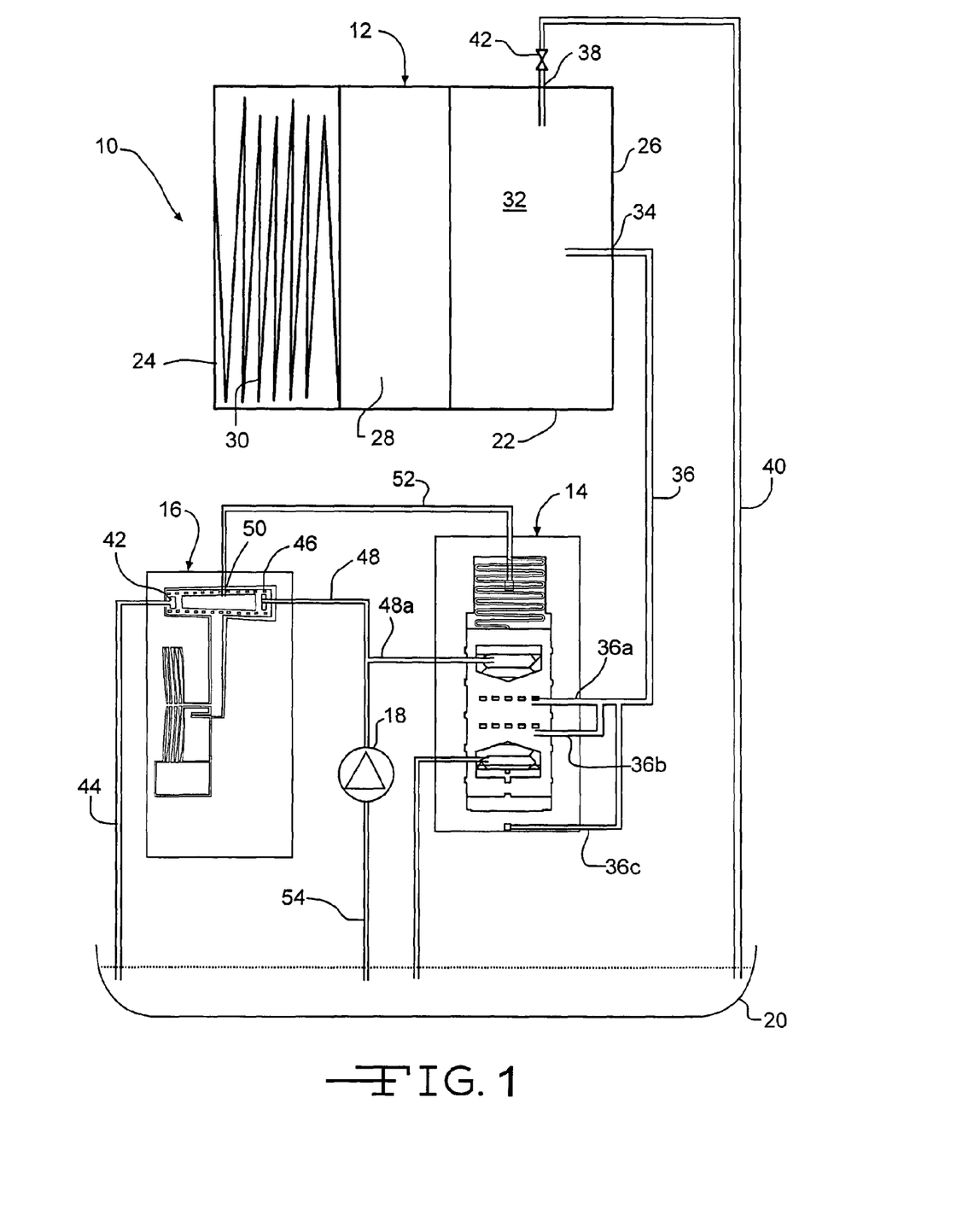
FIG. 1 is a fluid circuit diagram including a microvalve device in accordance with a first embodiment of the present invention.

Referring now to the drawings, there is illustrated in FIG. 1 a fluid circuit system 10. The fluid circuit system 10 includes a load device 12, a main valve 14, a pilot valve 16, a pump 18 and a reservoir 20.

The load device 12 is spring loaded piston device. However, it must be understood that the load device 12 may be any suitable device that may be included in a system in which the device is to have the flow of fluid to and/or from the device controlled. The load device 12 includes a generally cylindrical housing 22. The housing 22 has a first end 24 and a second end 26. A piston 28 is disposed within the housing 22 for reciprocating movement therein between the first end 24 and the second end 26. A spring 30 is disposed in the housing 22 between the first end 24 and the piston 28 to bias the piston 28 in a position between the first end 24 and the second end 26. The housing 22 and the piston 28 define a variable volume load chamber 32. The load chamber 32 contains a load, i.e. control, volume. A main port 34 is formed in the housing 22 that allows for fluid communication between the load chamber 32 and the main valve 14 via a main fluid conduit 36. An optional relief port 38 is formed in the housing 22 that allows for fluid communication between the load chamber 32 and the reservoir 20 via a relief fluid conduit 40. A one-way pressure relief check valve 42 is disposed in the relief fluid conduit 40 to allow fluid communication only from the load chamber 32 to the reservoir 20 above a predetermined pressure.

As shown, the pilot valve 16 is a microvalve type pilot valve and is intended to be exemplary of microvalve type pilot valves that are generally known. It must be understood, however, that the pilot valve 16 need not be a microvalve type pilot valve and may in fact be any device suitable to control the main valve 14, as will be further discussed below. The pilot valve 16 includes a pilot-dump port 42 that allows for fluid communication between the pilot valve 16 and the reservoir 20 via a pilot-dump fluid conduit 44. The pilot valve 16 includes a pilot-supply port 46 that allows for fluid communication between the pilot valve 16 and the pump 18 via a pilot-supply fluid conduit 48. The pilot valve 16 includes a pilot-command port 50 that allows for fluid communication between the pilot valve 16 and the main valve 14 via a pilot-command fluid conduit 52. The pilot valve 16 is operable to selectively place the pilot-command port 50 in fluid communication between the pilot-dump port 42 and the pilot-supply port 46.

The pump 18 is in fluid communication with the reservoir 20 via a pump-supply fluid conduit 54.

Figure 2:
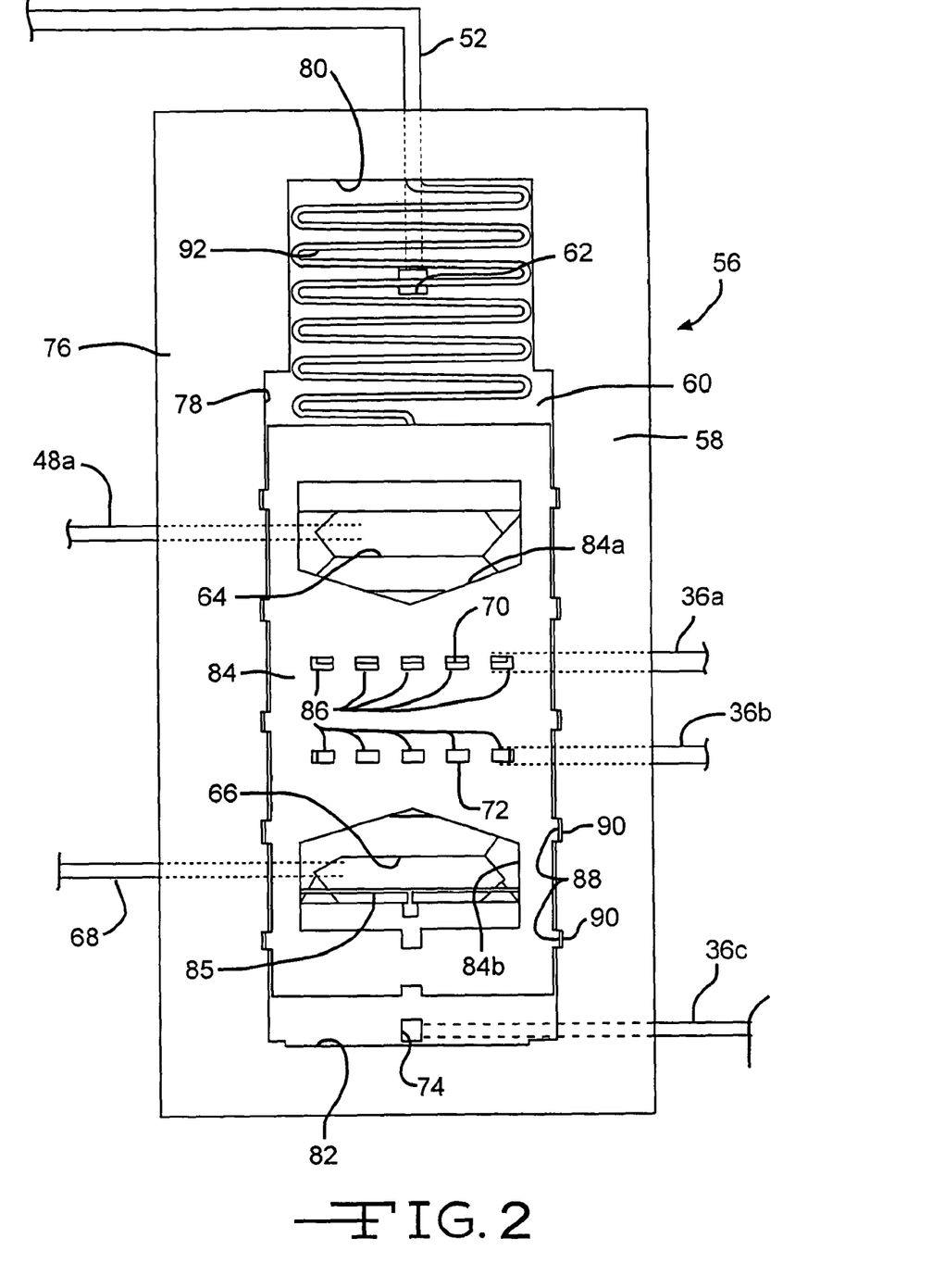
FIG. 2 is a top view of the microvalve device of FIG. 1.

The main valve 14 is a pilot operated micro spool valve, as best shown in FIG. 2, indicated generally at 56. The micro spool valve 56 includes a top layer (not shown), middle layer 58 and a bottom layer 60. The bottom layer 60 includes a main-command port 62 (first reference port) for fluid communication with the pilot valve 16 via the pilot-command fluid conduit 52. The bottom layer 60 includes a main-supply port 64 for fluid communication with the pump 18 via a main-supply fluid conduit 48a. The bottom layer 60 includes a main-dump port 66 for fluid communication with the reservoir 20 via a main-dump fluid conduit 68. The bottom layer 60 also includes first and second main-load ports 70 and 72 and a load-reference port 74 (second reference port) for fluid communication with the load device 12 via the main fluid conduit 36 via first, second, and third load fluid conduits 36a, 36b and 36c respectively. While the micro spool valve 56 has been described as having first and second main-load port 70 and 72 (main flow ports), it must be understood, however, that the micro spool valve 56 may have any suitable number of main-load ports as desired.

The middle layer 58 forms a main body 76. The main body 76 defines a spool chamber 78. The spool chamber has a first end 80 and a second end 82. The first end 80 is in communication with the source of command pressure, that is to say that the command port 62 is proximate the first end 80 to provided fluid communication with the pilot valve 16 to the volume of the spool chamber 78 proximate the first end 80. The second end 82 is in communication with the source of load pressure, that is to say that the load-reference port 74 is proximate the second end 82 to provided fluid communication with the load device 12 to the volume of the spool chamber 78 proximate the second end 82.

A micromachined spool 84 is disposed in the spool chamber 78 between the first and second ends 80 and 82. The spool 84 is operable to slidably move along the spool chamber 78 due to differential pressure across the spool 84 caused by pressure differences between the first and second ends 80 and 82. In a first situation where the command pressure is lower than the load pressure, the spool 84 moves to a first position proximate the first end 80 which allows fluid flow between the source of load pressure and a source of supply pressure via a first window 84a, that is to say that the load device 12 is placed in fluid communication with the pump 18 via fluid communication between the first load port 70 and the supply port 64. In a second situation where the command pressure is greater than the load pressure, the spool 84 moves to a second position proximate the second end 82 which allows fluid flow between the source of load pressure and the pressure vent via a second window 84b, that is to say that the load device 12 is placed in fluid communication with the reservoir 20 via fluid communication between the second load port 72 and the dump port 66. As shown in FIG. 2, the spool 84 is in a third, closed, position intermediate the first position and second positions which restricts fluid flow between the source of load pressure and both the source of supply pressure and the pressure vent, that is to say that the load device 12 is removed from fluid communication with the pump 18 and the reservoir 20. The spool 84 includes pressure-balancing windows 86 for the balancing of fluid pressure on the top and bottom side of the spool 84 when the spool 84 is in the closed potion.

The windows 84a and 84b are formed with a "D" shape so as to allow for gradual increase of fluid flow as the spool 84 moves positions. It must be understood, however, that the windows 84a and 84b may have any desired shape. As shown in FIG. 2, the second window 84b is provided with an optional reinforcement bar 85 to strengthen the spool 84. This optional bar 85 may remain in the micro spool valve 56 during operation or may alternatively be removed after manufacture.

The spool 84 and inner-wall of the spool chamber 78 have bumps 88 and recesses 90, respectively, that correspond when in the closed position. The bumps 88 are sufficiently shallow not to interfere with the travel of the spool 84 within the spool chamber 78. However, when the spool 84 is out of the closed position, the bumps 88 have diminished clearance to the inner-wall of the spool chamber 78 as compared to the clearance existing while the bumps 88 are adjacent respective ones of the recesses 90, and thus reduce leakage when in a position allowing fluid to flow into or out of the load device 12.

The middle layer 58 also includes a tether, in the form of a spring 92. The spring 92 moveably connects the body 76 to the spool 84. This provides for ease of manufacture, as the spool 84 is maintained relative to the body 76 when the top layer, middle layer 58 and bottom layer 60 are formed together.

Preferably, the spring 92 biases the spool 84 in the closed position.

In one preferred manufacture operation, the body 76, spool 84 and spring 92 are integrally formed from a plate forming the middle layer 58 and defining the spool chamber 78.

In the exemplary fluid circuit system 10 the main valve 14 is a pilot operated center closed spool valve, although it must be understood that the main valve 14 may be other than as shown and described. The main valve 14 is shown in an illustrative example in FIG. 1 as being used to control the pressure in the chamber 32 and in turn controlling the pressure acting on the piston 28 in the housing 22. It must be understood, however, that the load device 12 may be any suitable device in which it may be desired to control the flow of fluid by use of the main valve 14.

In the example illustrated in FIG. 1 the first and second main-load ports 70 and 72 are used to control the flow into and out of the chamber 32 respectively. In this example, the first and second main-load ports 70 and 72 function as a split center port with separate passageways for each of flow into and flow out of the chamber 32. It is contemplated, however, that the micro spool valve 56 may be formed with a single port for flow into and out of the chamber 32 or that the micro spool valve 56 may be formed with additional port to provide multiple ports for flow into and out of the chamber 32.

As illustrated in FIG. 2, the micro spool valve 56 is configured using a "U-flow" arrangement where flow through the ports 64, 66, 70, and 72 occur on the same side of the valve 56, e.g., all flow being via ports through the bottom layer 60. However, it must be understood that the micro spool valve 56 may be configured using other flow arrangements as desired. For example, ports may be disposed in the top layer and bottom layer 60 to use a "flow through" arrangement. Additionally, the micro spool valve 56 may be configured with ports in the middle layer 58 to use a "flow across" arrangement.

In the exemplary system 10, shown in FIG. 1, the pilot valve 16 is shown as a proportional valve, i.e. in an unactuated position the pilot valve 16 is fully open to the reservoir 20, in a fully actuated position the pilot valve 16 is fully open to the pump 18, and in a position between the two extremes the flow is proportional to the amount of actuation. It must be understood that other pilot valve arrangement may be used, including a "digital" type valve where flow is on or off and or switchable between closed, supply and dump.

For further example, in one control strategy, when a pressure increase is desired the pilot valve 16 directs high pressure from the pump 18 into the command port 62 of the spool valve 56. This will move the spool 84 in a direction so as to open the same, or another, high pressure source to the load chamber 32 increasing the pressure. As the pressure in the load chamber 32 increases so to does the reference pressure on the opposite end of the spool 84, thus "re-centering" the spool as the desired commanded pressure is matched in the load chamber 32. A similar process may used to reduce the pressure in the load chamber 32 by the pilot valve 32 reducing command pressure by dumping fluid to the reservoir 20.

Preferably, the micro spool valve 56 is a MEMS device valve with three or four ports for controlling flow both into and out of a control chamber of a load device. Preferably, the spool valve 56 is normally closed to load device. The spool valve preferably includes the bi-directional spool 84 which can open the control chamber to either the first or second load ports 64 and 66 depending on the direction of movement of the spool 84, although such is not required. Preferably, the pilot valve 16 is a MEMS device pilot valve used to control the pressure on one end of the spool 84, although such is not required. The opposite end of the spool 84 is preferably in communication with the load chamber 32. The spool 84 is thus in a preferred arrangement where the spool 84 is pressure balanced when the command pressure from the pilot valve 16 and the control pressure from the load device 32 are equal. In a preferred operation to achieve a pressure change in the load chamber 32, the actuation state of the pilot valve 16 is changed which in turn results in a change in the pressure on the command side of the spool 84. In this operational example, the command pressure will be proportional to the command signal and will be equivalent to the desired control pressure. If the reference pressure on control side of the spool 84 is greater than the command pressure, then the spool will move towards the command side and open the first load port 70 to the dump port 64. If the control pressure is less than the command pressure, then the spool 84 will move away from the command end and open the second load port 72 to the supply port 66, and the high pressure source.

In one preferred application, the load device 12 of the system 10 does not require a continuous flow supplied. The operation of the system 10 is designed with a "deadband" at the zero position where the load pressure is held constant, assuming no leakage. The size of the deadband may be varied as desired and in one example may depend on the amount of overlap built into the spool 84 between the first and second load ports 70 and 72. If desired, a continuous flow can be achieved by adding an additional optional port to the load device 12 of the system 10 which provides flow into or out of the load chamber 32.

Figure 3:
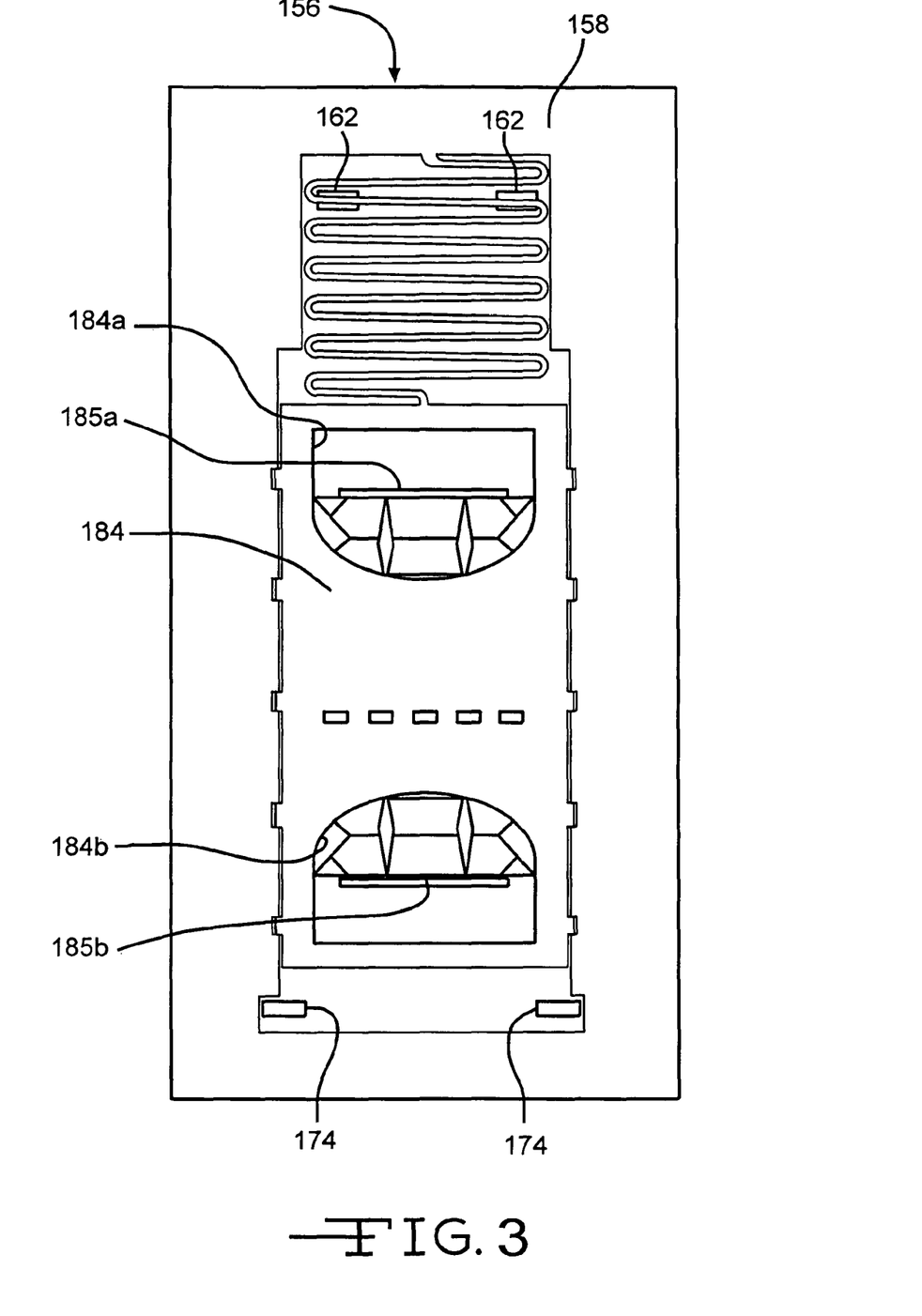
FIG. 3 is a top view of a microvalve device according to a second embodiment of the present invention.
Figure 4:
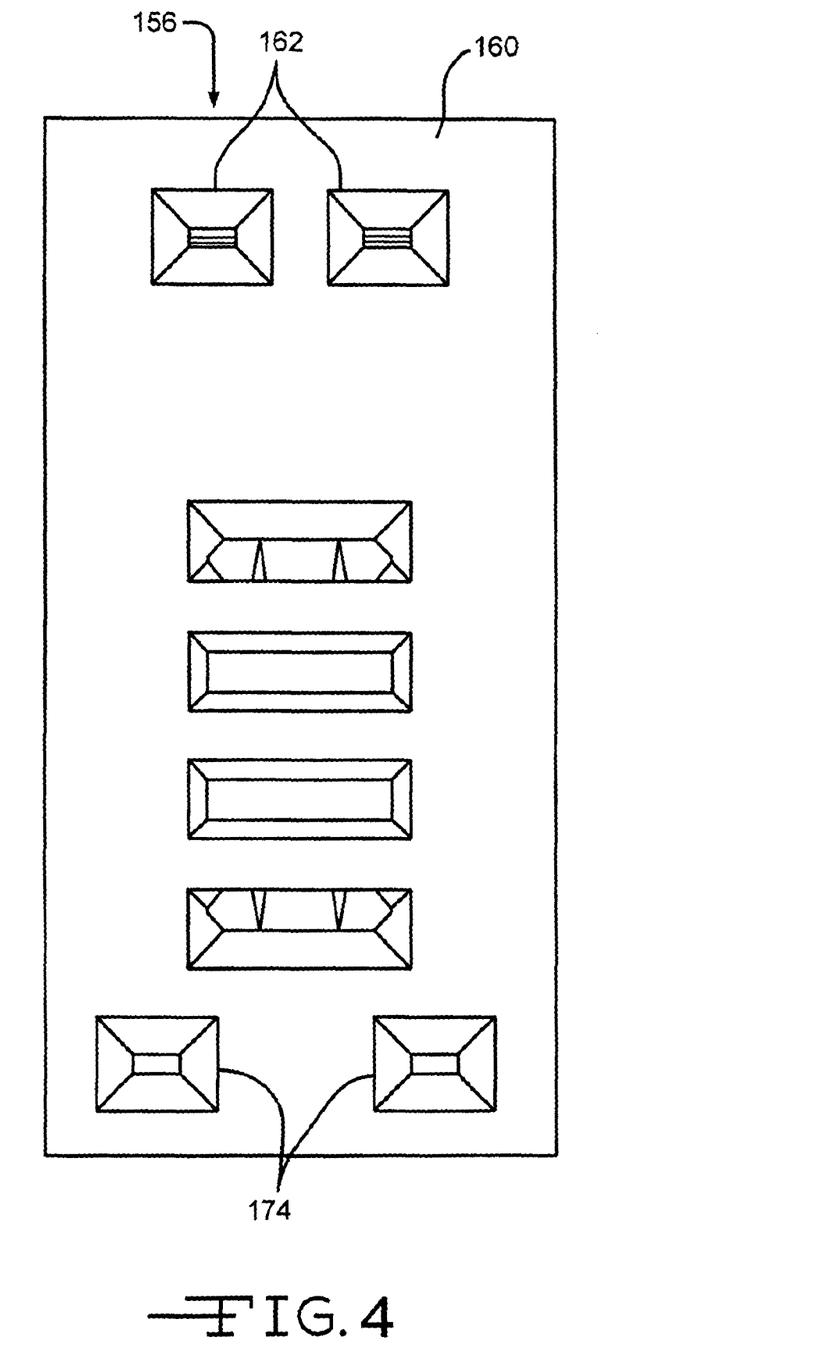
FIG. 4 is a bottom view of the microvalve device of FIG. 3.

There is shown in FIGS. 3 and 4 a micro spool valve 156 according to another embodiment of the present invention. FIG. 3 is a top view of the micro spool valve 156 and FIG. 4 is a bottom view of the micro spool valve 156. Similar elements as to FIGS. 1 and 2 are labeled with similar identifiers, plus 100. The micro spool valve 156 of FIGS. 3 and 4 is similar the micro spool valve 56, except as noted below.

The micro spool valve 156 includes a middle layer 158 and a bottom layer 160. The bottom layer 160 includes multiple command ports 162 and multiple load reference ports 174.

The middle layer 158 includes a spool 184 having first and second reinforcement bars 185a and 185b in first and second windows 184a and 184b respectively. The first and second windows 184a and 184b and "D" shaped and the first and second reinforcement bars 185a and 185b each include diamond shaped support protrusions that are attached along the curved wall that defines the curved side of each of the first and second "D" shaped windows 184a and 184b. As shown in FIG. 3, the curved wall of the first and second "D" shaped windows 184a and 184b is formed as a smooth ellipse.

In the position toward the load reference ports 174, the bottom of the spool 184 will at least partially cover the load reference ports 174.

While the principle and mode of operation of this invention have been explained and illustrated with regards to particular embodiments, it must, however, be understood that this invention may be practiced otherwise than as specifically explained and illustrated without departing from its spirit or scope.

What is claimed is:

1. A microvalve device for controlling fluid flow comprising:
a body defining a chamber having first and second ends, the first end being in communication with a source of command pressure, the second end being in communication with a source of load pressure; and
a micromachined spool disposed in the chamber between the first and second ends for sliding movement influenced by differential pressure across the micromachined spool, the micromachined spool being movable between a first position, in which allows fluid flow between the source of load pressure and a source of supply pressure, and a second position, which allows fluid flow between the source of load pressure and a pressure vent, the micromachined spool having a closed position intermediate the first position and the second position which restricts fluid flow between the source of load pressure and both the source of supply pressure and the pressure vent, wherein the micromachined spool is moveably connected to the body.

2. The microvalve device of claim 1 wherein the micromachined spool is moveably connected to the body by a tether.

3. The microvalve device of claim 2 wherein the tether is a spring.

4. The microvalve device of claim 3 wherein the spring biases the micromachined spool in the closed position.

5. The microvalve device of claim 2 wherein the body includes a plate, the plate defining the chamber, and wherein the tether and the micromachined spool are integrally formed with the plate.

6. The microvalve device of claim 1 wherein the body includes a first reference port proximate the first end, a second reference port proximate the second end, a first flow port disposed between the first reference port and the second reference port, a first supply port disposed between the first reference port and the first flow port, and a dump port, in which the first reference port, the second reference port, the first flow port, the first supply port, and the dump port are in fluid communication with the chamber.

7. The microvalve device of claim 1, wherein the source of command pressure includes a pilot valve for controlling the command pressure, the position of the micromachined spool in the chamber being based at least in part upon the command pressure.

8. The microvalve device of claim 7 wherein the pilot valve is a microvalve type pilot valve.

9. The microvalve device of claim 7 wherein the pilot valve is a proportional valve.

10. The microvalve device of claim 7 wherein the pilot valve is a digital valve.

11. The microvalve device of claim 7 wherein the micromachined spool defines at least one window for the passage of fluid therethrough.

12. The microvalve device of claim 11 wherein the window is formed with a D-shaped cross section.

13. The microvalve device of claim 11 wherein the window is formed as a smooth ellipse.

14. The microvalve device of claim 11 wherein a reinforcement bar is provided within the window, the reinforcement bar extending from one portion of the micromachined spool to another portion of the micromachined spool.

15. The microvalve device of claim 7 wherein the source of load pressure includes a load device.

16. The microvalve device of claim 15 wherein the micromachined spool and the body are configured as one of a u-flow valve and a flow-though valve.

17. The microvalve device of claim 15 wherein the load device is a spring loaded piston device.

18. The microvalve device of claim 15 wherein the load device defines a variable volume load chamber in which a control volume is regulated by the flow of fluid at least one of to and from the load device.

19. The microvalve device of claim 15 wherein the micromachined spool is configured to allow for increase or decrease of the flow of fluid to or from the load device in relation to the slidable movement of the micromachined spool along the spool chamber.

20. The microvalve device of claim 15 wherein the micromachined spool has a deadband about the center position where no flow of fluid is permitted to or from the load device.

* * * * *